3,706,548
N-CYCLOALKYL-2,3,6-TRICHLOROBENZYLIDENE-
IMINES AND THEIR USE AS HERBICIDES
Edmund J. Rumanowski, Dover, N.J., assignor to
Tenneco Chemicals Inc.
No Drawing. Original application Oct. 18, 1967, Ser. No.
676,052, now Patent No. 3,637,851, dated Jan. 25,
1972. Divided and this application Sept. 23, 1970, Ser.
No. 74,903
Int. Cl. H01n 9/206
U.S. Cl. 71—121                    20 Claims

ABSTRACT OF THE DISCLOSURE

Compounds having the structural formula

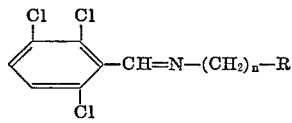

wherein $n$ represents an integer in the range of zero to four and R represents a monocyclic or bicyclic aliphatic group are effective selective herbicides. Illustrative of these herbicidal compounds are N-cyclohexyl-2,3,6-trichlorobenzylideneimine, N-cyclohexylmethyl - 2,3,6 - trichlorobenzylideneimine, and N-cycloheptyl-2,3,6-trichlorobenzylideneimine.

---

This is a division of my copending application Ser. No. 676,052, which was filed on Oct. 18, 1967, now U.S. Pat. 3,637,851.

This invention relates to herbicidal compositions that contain N-cycloalkyl-2,3,6-trichlorobenzylideneimines and to the use of these compositions in the control of plant growth.

The herbicidal compounds of this invention are N-cycloalkyl-2,3,6-trichlorobenzylideneimines that have the structural formula

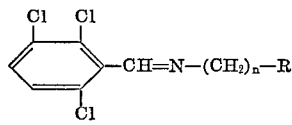

wherein $n$ represents an integer in the range of zero to four and R represents a monocyclic or bicyclic aliphatic group having from 3 to 12 carbon atoms, such as cyclopropyl, cyclobutyl, cyclohexyl, cycloheptyl, cyclooctyl, norbornyl, and the like. Illustrative of these compounds are the following:

N-cyclopropyl-2,3,6-trichlorobenzylideneimine,
N-cyclobutylmethyl-2,3,6-trichlorobenzylideneimine,
N-cyclooctyl-2,3,6-trichlorobenzylideneimine,
N-cyclohexylbutyl-2,3,6-trichlorobenzylideneimine,
N-cyclooctylpropyl-2,3,6-trichlorobenzylideneimine,
N-norbornyl-2,3,6-trichlorobenzylideneimine,
N-norbornylbutyl-2,3,6-trichlorobenzylideneimine,
N-cycloheptylethyl-2,3,6-trichlorobenzylideneimine,
N-[bicyclo(2.2.1)heptylmethyl]-2,3,6-trichlorobenzylideneimine, and the like.

The herbicidal compounds of this invention may be prepared by any suitable and convenient procedure. For example, they may be prepared by the reaction of 2,3,6-trichlorobenzaldehyde with a substantially equivalent amount of a cycloalkyl amine at a temperature in the range of about 60° C. to 100° C. If desired, a small excess of either the aldehyde or the amine may be used. The reaction is generally carried out in a solvent, such as ethanol or propanol.

The N-cycloalkyl-2,3,6-trichlorobenzylideneimines have unusual and valuable activity as selective herbicides. In addition certain of these compounds also have fungicidal and bactericidal activity.

The N-cycloalkyl-2,3,6-trichlorobenzylideneimines may be applied to the soil or other medium normally supporting plant growth to control or inhibit the growth of plants therein, or they may be applied to the plants to control their growth. They can be used to control weed growth in an area containing a crop, or they can be used to keep an area free from all plant growth.

While the herbicidal compounds may be applied as such for the control of plant growth, they are ordinarily and preferably used in combination with an inert diluent or carrier to make it easier to measure accurately and apply evenly the small amounts of the compounds that are required to inhibit plant growth as well as to apply them in a form that will be readily dispersed through the soil and/or absorbed by the plants. The compounds may be dispersed in water with or without the aid of a wetting agent and the resulting aqueous dispersions employed as sprays. Alternatively, the compounds may be used as the active herbicidal constituent in ketone, alcohol, ether, or hydrocarbon solutions or in oil-in-water emulsions. The compounds may also be mixed with or deposited upon finely-divided solid carriers, such as talc, clay, diatomaceous earth, silica, walnut shell flour, and the like, and employed as dusts. The concentration of the herbicidal compound in the composition may vary widely and depends upon a number of factors, the most important of which are the amount of the composition to be applied per unit of area and the type or types of plants being treated. In most cases the herbicidal compositions are applied as sprays or dusts that contain from about 0.1 percent to 50 percent, and preferably 0.2 percent to 10 percent by weight of an N-cycloalkyl-2,3,6-trichlorobenzylideneimine. The amount of the herbicidal composition that is used is that which will apply about 1 pound to 10 pounds of the herbicidal compound per acre. Mixtures of two or more of the N-cycloalkyl-2,3,6-trichlorobenzylideneimines may be used in the preparation of the herbicidal compositions; if desired, the compositions may also contain other herbicides, fungicides, or insecticides.

The invention is further illustrated by the examples that follow. In these examples, all percentages are percentages by weight.

EXAMPLE 1

A reaction mixture containing 14.8 grams (0.07 mole) of 2,3,6-trichlorobenzaldehyde, 8.0 grams (0.08 mole) of cyclohexylamine, and 125 ml. of ethanol was heated at its reflux temperature for 2 hours, then cooled to —40° C. and filtered. The reaction mixture was diluted with 400 ml. of water and filtered. The crude product that was obtained was extracted with 100 ml. of petroleum ether (20°–40° C.), washed with 100 ml. of water, dried with anhydrous magnesium sulfate, and stripped of solvent. There was obtained 10 grams of N-cyclohexyl-2,3,6-trichlorobenzylideneimine, which melted at 38°–43° C. and which contained 37.2% Cl, 4.83% N, 55.1% C, and 4.94% H (calculated, 36.7% Cl, 4.82% N, 53.8% C, and 4.83% H). Infrared analysis of the product indicated the presence of the imine grouping.

EXAMPLE 2

A reaction mixture containing 14.7 grams (0.07 mole) of 2,3,6-trichlorobenzaldehyde, 7.91 grams (0.07 mole) of cyclohexylmethylamine, and 100 ml. of ethanol was heated at its reflux temperature for one hour and then cooled to room temperature. The reaction mixture was diluted with 400 ml. of water and filtered, and the crude product obtained was dried and recrystallized from ethanol. The N-cyclohexylmethyl-2,3,6-trichlorobenzylideneimine obtained melted at 54°–56° C. and contained 34.7% Cl, 4.75% N, 55.7% C, and 5.23% H (calculated, 34.9% Cl, 4.59% N, 55.1% C, and 5.23% H). Infrared analysis of the recrystallized product indicated the presence of the imine grouping.

EXAMPLE 3

The procedure of Example 1 was repeated using 21 grams (0.1 mole) of 2,3,6-trichlorobenzaldehyde, 15.5 grams (0.1 mole) of 4-cyclohexylbutylamine, and 100 ml. of ethanol. The N-(4-cyclohexylbutyl)-2,3,6-trichlorobenzylideneimine, which was obtained in a 71% yield, was an oil that contained 30.1% Cl, 3.93% N, 60.4% C, and 6.43% H (calculated, 30.7% Cl, 4.03% N, 58.8% C, and 6.31% H).

EXAMPLE 4

The procedure of Example 1 was repeated using 9.0 grams (0.08 mole) of cycloheptylamine instead of the cyclohexylamine. The N-cycloheptyl-2,3,6-trichlorobenzylideneimine obtained contained 35.7% Cl, 4.57% N, 55.8% C, and 5.30% H, (calculated, 35.0% Cl, 4.61% N, 55.3% C, and 5.30% H). Infrared analysis of the product indicated the presence of the imine grouping.

EXAMPLE 5

The procedure of Example 1 was repeated using 21 grams (0.1 mole) of 2,3,6-trichlorobenzaldehyde, 12.7 grams (0.1 mole) of cyclooctylamine, and 150 ml. of ethanol. The N - cyclooctyl - 2,3,6 - trichlorobenzylideneimine, which was obtained in an 84% yield, was an oil that contained 32.9% Cl, 4.32% N, 57.3% C, and 5.74% H (calculated, 33.4% Cl, 4.40% N, 56.4% C, and 5.70% H).

EXAMPLE 6

A reaction mixture containing 10.5 grams (0.05 mole) of 2,3,6-trichlorobenzaldehyde, 8.1 grams (0.05 mole) of endo-2-aminomethylbicyclo(2.2.1)heptane, 10.8 grams (0.05 mole) of a 25% solution of sodium methoxide in methanol, and 100 ml. of ethanol was heated at its reflux temperature for one hour and then cooled to room temperature. The reaction mixture was diluted with 200 ml. of water. The oil that separated was extracted with isopropyl ether, dried over magnesium sulfate, and filtered. There was obtained a 50% yield of N-[endo-2-bicyclo(2.2.1)heptylmethyl] - 2,3,6 - trichlorobenzylideneimine, which was an oil that contained 33.2% Cl, 5.3% N, 56.8% C, and 5.1% H (calculated, 33.6% Cl, 4.4% N, 56.8% C, and 5.0% H). Infrared analysis of the product indicated the presence of the imine grouping.

EXAMPLE 7

The procedure described in Example 6 was repeated using 21.0 grams (0.1 mole) of 2,3,6-trichlorobenzaldehyde, 14.8 grams (0.1 mole) of 2-norbornylamine hydrochloride, 5.4 grams (0.1 mole) of sodium methoxide, and 100 ml. of ethanol. There was obtained a 57% yield of N-(2-norbornyl)-2,3,6-trichlorobenzylideneimine, an oil that contained 36.2% Cl, 4.46% N, 57.7% C, and 4.63% H (calculated, 35.2% Cl, 4.63% N, 55.6% C, and 4.63% H).

EXAMPLE 8

Acetone solutions were prepared by dissolving 100 mg. portions of the products of Examples 1–7 in 10 ml. portions of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 0.1 percent of the N-cycloalkyl-2,3,6-trichlorobenzylideneimines.

EXAMPLE 9

Series of tests were carried out in which the products of Examples 1–7 were evaluated as preemergence and postemergence selective herbicides. In the preemergence tests, solutions prepared by the procedure described in Example 8 were applied to groups of flats containing soil in which had been planted seeds of various plant species. The results of the tests were observed 10 days after the treatment. The postemergence tests were carried out by spraying seedlings of various plant species with solutions of the N-cycloalkyl-2,3,6-trichlorobenzylideneimines and observing the results 43 days after this treatment. In both series of tests the solutions were used in amounts that supplied 0.31 pound to 20 pounds of the test compound per acre.

In Tables I and II a numerical scale is used to show the herbicidal activity of the test compounds. On this scale, "1" indicates no injury to the plants; "2" indicates slight injury; "3" indicates moderate injury; "4" indicates severe injury; and "5" indicates that all of the plants were killed.

TABLE I

[Preemergence herbicidal activity of N-cycloalkyl-2,3,6-trichlorobenzylideneimines]

| Herbicide | Dosage (lbs./acre) | Plant species [1] | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Product of Example 1 | 20 | 5 | 5 | 4 | 1 | 1 | 1 | 3 | 5 | 4 | 4 | 5 | 4 |
| | 10 | 5 | 5 | 3 | 1 | 1 | 1 | 3 | 5 | 4 | 4 | 5 | 2 |
| | 5 | 5 | 2 | 3 | 1 | 1 | 1 | 2 | 5 | 4 | 1 | 3 | 1 |
| | 2.5 | 5 | 2 | 3 | 1 | 1 | 1 | 5 | 5 | 2 | 1 | 2 | 1 |
| | 1.25 | 3 | 1 | 1 | 1 | 1 | 1 | 2 | 1 | 1 | 1 | 2 | 1 |
| | 0.625 | 2 | 1 | 1 | 1 | 1 | 1 | 1 | 1 | 1 | 1 | 2 | 1 |
| | 0.31 | 1 | 1 | 1 | 1 | 1 | 1 | 1 | 1 | 1 | 1 | 1 | 1 |
| Product of Example 2 | 20 | 5 | 4 | 4 | 4 | 4 | 4 | 4 | 5 | 5 | 4 | 4 | 4 |
| | 10 | 5 | 3 | 3 | 2 | 1 | 1 | 4 | 5 | 5 | 1 | 4 | 1 |
| | 5 | 5 | 3 | 3 | 2 | 1 | 1 | 1 | 5 | 2 | 1 | 4 | 1 |
| | 2.5 | 4 | 3 | 3 | 2 | 1 | 1 | 1 | 3 | 2 | 1 | 3 | 1 |
| | 1.25 | 2 | 1 | 2 | 1 | 1 | 1 | 1 | 1 | 1 | 1 | 1 | 1 |
| Product of Example 3 | 20 | 5 | 5 | 5 | 5 | 2 | 2 | 5 | 5 | 5 | 5 | 5 | 4 |
| | 10 | 5 | 3 | 5 | 3 | 1 | 1 | 5 | 2 | 2 | 2 | 4 | 2 |
| | 5 | 5 | 3 | 5 | 3 | 1 | 1 | 4 | 2 | 2 | 2 | 4 | 2 |
| Product of Example 4 | 10 | 5 | 5 | 5 | 2 | 2 | 1 | 5 | 5 | 3 | 4 | 5 | 4 |
| | 5 | 5 | 5 | 5 | 2 | 2 | 1 | 4 | 5 | 3 | 1 | 5 | 3 |
| | 2.5 | 4 | 1 | 5 | 1 | 1 | 1 | 3 | 3 | 3 | 1 | 1 | 1 |
| | 1.25 | 4 | 1 | 4 | 1 | 1 | 1 | 2 | 2 | 1 | 2 | 1 | 1 |
| | 0.625 | 3 | 1 | 2 | 1 | 1 | 1 | 1 | 1 | 1 | 1 | 1 | 1 |
| Product of Example 5 | 20 | 5 | 5 | 5 | 5 | 1 | 1 | 5 | 5 | 5 | 4 | 5 | 4 |
| | 10 | 5 | 5 | 5 | 3 | 1 | 1 | 4 | 5 | 4 | 4 | 5 | 4 |
| | 5 | 5 | 5 | 4 | 3 | 1 | 1 | 3 | 5 | 2 | 2 | 4 | 2 |
| Product of Example 6 | 20 | 5 | 5 | 5 | 4 | 4 | 5 | 5 | 5 | 5 | 5 | 5 | 5 |
| | 10 | 5 | 4 | 5 | 5 | 3 | 3 | 5 | 5 | 4 | 4 | 5 | 5 |
| | 5 | 5 | 4 | 4 | 3 | 2 | 1 | 4 | 4 | 3 | 3 | 4 | 3 |
| | 2.5 | 3 | 1 | 3 | 1 | 1 | 1 | 4 | 3 | 3 | 1 | 3 | 1 |
| | 1.25 | 3 | 1 | 1 | 1 | 1 | 1 | 1 | 1 | 1 | 1 | 1 | 1 |
| Product of Example 7 | 20 | 5 | 5 | 5 | 5 | 2 | 2 | 5 | 5 | 2 | 5 | 5 | 5 |
| | 10 | 5 | 4 | 4 | 2 | 1 | 1 | 5 | 5 | 2 | 2 | 5 | 3 |
| | 5 | 5 | 4 | 5 | 2 | 1 | 1 | 3 | 5 | 2 | 3 | 4 | 2 |

[1] See footnote at end of Table II.

TABLE II

[Postemergence herbicidal activity of N-cycloalkyl-2,3,6-trichlorobenzylideneimines]

| Herbicide | Dosage (lbs./acre) | Plant species [1] | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Product of Example 1 | 20 | 5 | 5 | 5 | 3 | 5 | 3 | 5 | 5 | 5 | 2 | 3 | 4 |
| | 10 | 5 | 5 | 5 | 3 | 5 | 3 | 4 | 5 | 5 | 2 | 3 | 3 |
| | 5 | 4 | 5 | 5 | 3 | 2 | 2 | 2 | 2 | 5 | 2 | 3 | 2 |
| | 2.5 | 4 | 3 | 3 | 2 | 2 | 2 | 1 | 1 | 2 | 2 | 1 | 1 |
| Product of Example 2 | 20 | 5 | 5 | 5 | 5 | 3 | 3 | 3 | 5 | 5 | 3 | 5 | 4 |
| | 10 | 5 | 5 | 5 | 4 | 3 | 3 | 3 | 3 | 5 | 2 | 3 | 3 |
| | 5 | 4 | 5 | 5 | 3 | 3 | 2 | 3 | 3 | 5 | 2 | 3 | 2 |
| | 2.5 | 4 | 4 | 4 | 5 | 2 | 2 | 2 | 2 | 2 | 1 | 1 | 1 |
| | 1.25 | 2 | 2 | 5 | 1 | 1 | 1 | 1 | 1 | 1 | 1 | 1 | 1 |
| | 0.31 | 1 | 1 | 5 | 1 | 1 | 1 | 1 | 1 | 1 | 1 | 1 | 1 |
| Product of Example 3 | 20 | 5 | 5 | 5 | 4 | 3 | 3 | 5 | 5 | 5 | 4 | 5 | 5 |
| | 10 | 5 | 5 | 4 | 3 | 2 | 2 | 5 | 5 | 5 | 2 | 3 | 3 |
| | 5 | 4 | 5 | 4 | 3 | 2 | 2 | 3 | 2 | 5 | 2 | 3 | 2 |
| Product of Example 4 | 10 | 5 | 5 | 5 | 3 | 3 | 4 | 3 | 3 | 4 | 3 | 5 | 4 |
| | 5 | 5 | 5 | 5 | 3 | 1 | 2 | 2 | 3 | 4 | 1 | 5 | 2 |
| | 2.5 | 3 | 5 | 4 | 2 | 2 | 2 | 1 | 2 | 3 | 1 | 1 | 1 |
| | 1.25 | 2 | 2 | 4 | 1 | 1 | 2 | 2 | 1 | 1 | 1 | 1 | 1 |
| | 0.625 | 2 | 2 | 4 | 1 | 1 | 1 | 2 | 1 | 1 | 1 | 1 | 1 |
| Product of Example 5 | 20 | 5 | 5 | 5 | 4 | 3 | 4 | 5 | 5 | 5 | 4 | 5 | 3 |
| | 10 | 5 | 5 | 4 | 3 | 3 | 3 | 5 | 3 | 3 | 2 | 4 | 4 |
| | 5 | 4 | 5 | 4 | 3 | 2 | 2 | 2 | 2 | 3 | 2 | 3 | 3 |

TABLE II—Continued

| Herbicide | Dosage (lbs./acre) | Plant species [1] | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Product of Example 6 | 20 | 5 | 5 | 5 | 5 | 3 | 4 | 5 | 5 | 3 | 5 | 5 |
| | 10 | 5 | 5 | 5 | 5 | 3 | 3 | 4 | 5 | 2 | 4 | 4 |
| | 5 | 5 | 5 | 4 | 3 | 2 | 3 | 3 | 3 | 4 | 2 | 4 |
| | 2.5 | 3 | 4 | 3 | 3 | 1 | 1 | 1 | 1 | 1 | 2 | 3 |
| | 1.25 | 3 | 3 | 1 | 1 | 1 | 1 | 1 | 1 | 1 | 1 | 1 |
| Product of Example 7 | 20 | 5 | 5 | 5 | 4 | 3 | 3 | 5 | 4 | 3 | 4 | 4 |
| | 10 | 5 | 5 | 4 | 3 | 2 | 2 | 2 | 3 | 5 | 2 | 3 |
| | 5 | 3 | 5 | 3 | 2 | 2 | 2 | 1 | 2 | 2 | 2 | 2 |

[1] Plant species: 1. Clover; 2. Soybean; 3. Sugar beet; 4. Cotton; 5. Corn; 6. Oats; 7. Mustard; 8. Morning glory; 9. Buckwheat; 10. Rye grass; 11. Crab grass; 12. Yellow foxtail.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A process for the control of plant growth in a medium normally supporting plant growth which comprises applying to the medium a phytotoxic amount of a herbicidal compound having the structural formula

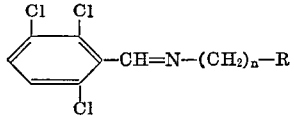

wherein $n$ represents an integer in the range of zero to four and R represents a cyclohexyl, cycloheptyl, cyclooctyl, bicyclo (2.2.1) heptyl, or norbornyl group.

2. The process of claim 1 wherein the herbicidal compound is N-cyclohexyl-2,3,6-trichlorobenzylideneimine.
3. The process of claim 1 wherein the herbicidal compound is N-cyclohexylmethyl-2,3,6-trichlorobenzylideneimine.
4. The process of claim 1 wherein the herbicidal compound is N-cycloheptyl-2,3,6-trichlorobenzylideneimine.
5. The process of claim 1 wherein the herbicidal compound is N-(4-cyclohexylbutyl)-2,3,6-trichlorobenzylideneimine.
6. The process of claim 1 wherein the herbicidal compound is N-cyclooctyl-2,3,6-trichlorobenzylideneimine.
7. The process of claim 1 wherein the herbicidal compound is N-[endo-2-bicyclo(2.2.1)heptylmethyl]-2,3,6-trichlorobenzylideneimine.
8. The process for the control of plant growth which comprises applying to the plants a phytotoxic amount of a herbicidal compound having the structural formula

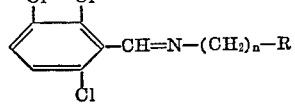

wherein $n$ represents an integer in the range of zero to four and R represents a cyclohexyl, cycloheptyl, cyclooctyl, bicyclo (2.2.1) heptyl, or norbornyl group.

9. The process of claim 8 wherein the herbicidal compound is N-cyclohexyl-2,3,6-trichlorobenzylideneimine.
10. The process of claim 8 wherein the herbicidal compound is N-cyclohexylmethyl-2,3,6-trichlorobenzylideneimine.
11. The process of claim 8 wherein the herbicidal compound is N-cycloheptyl-2,3,6-trichlorobenzylideneimine.
12. The process of claim 8 wherein the herbicidal compound is N-(4-cyclohexylbutyl)-2,3,6 - trichlorobenzylideneimine.
13. The process of claim 8 wherein the herbicidal compound is N-cyclooctyl-2,3,6-trichlorobenzylideneimine.
14. The process of claim 8 wherein the herbicidal compound is N-[endo-2-bicyclo(2.2.1)heptylmethyl]-2,3,6-trichlorobenzylideneimine.
15. A herbicidal composition comprising an inert carrier and about 0.1 percent to 50 percent by weight of a herbicidal compound having the structural formula

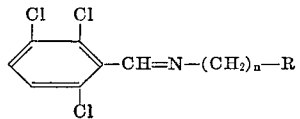

wherein $n$ represents an integer in the range of zero to four and R represents a cyclohexyl, cycloheptyl, cyclooctyl, bicyclo (2.2.1) heptyl, or norbornyl group.

16. A herbicidal composition as set forth in claim 15 that contains 0.2 percent to 10 percent by weight of the herbicidal compound.
17. A herbicidal composition as set forth in claim 15 wherein the herbicidal compound is N-cyclohexylmethyl-2,3,6-trichlorobenzylideneimine.
18. A herbicidal composition as set forth in claim 15 wherein the herbicidal compound is N-cyclohexyl-2,3,6-trichlorobenzylideneimine.
19. A herbicidal composition as set forth in claim 15 wherein the herbicidal compound is N-cycloheptyl-2,3,6-trichlorobenzylideneimine.
20. A herbicidal composition as set forth in claim 15 wherein the herbicidal compound is N-[endo-2-bicyclo-(2.2.1)heptamethyl]-2,3,6-trichlorobenzylideneimine.

References Cited
UNITED STATES PATENTS 3,197,504   7/1965   Harvey, Jr. ———————— 71—121
3,466,164   9/1969   De Gaetano et al. ————— 71—121

JAMES O. THOMAS, Jr., Primary Examiner